(12) United States Patent
Steele

(10) Patent No.: US 12,078,349 B2
(45) Date of Patent: Sep. 3, 2024

(54) COMBUSTION SYSTEM

(71) Applicant: ROLLS-ROYCE plc, London (GB)

(72) Inventor: David Steele, Cheltenham (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/302,952

(22) Filed: Apr. 19, 2023

(65) Prior Publication Data

US 2023/0366544 A1 Nov. 16, 2023

(30) Foreign Application Priority Data

May 11, 2022 (GB) .................................... 2206881

(51) Int. Cl.
*F23Q 13/00* (2006.01)
*F02K 3/02* (2006.01)
*F23R 3/18* (2006.01)
*F23R 3/28* (2006.01)
*H05H 1/24* (2006.01)

(52) U.S. Cl.
CPC ............... *F23Q 13/00* (2013.01); *F02K 3/02* (2013.01); *F23R 3/18* (2013.01); *F23R 3/28* (2013.01); *H05H 1/24* (2013.01); *H05H 2245/80* (2021.05)

(58) Field of Classification Search
CPC ...... F23R 3/18; F23R 3/20; F23R 3/28; F23R 3/283; F23R 3/286; F23R 2900/00009; F02K 3/02; F02K 3/10; F02K 7/14; F02K 7/16; F23Q 13/00; F02C 7/264; F02C 7/266
See application file for complete search history.

(56) References Cited

U.S. PATENT DOCUMENTS

| 2,705,869 A | | 4/1955 | Johnstone | |
|---|---|---|---|---|
| 3,603,094 A | * | 9/1971 | Townend | .................. F23R 3/24 60/761 |
| 3,931,707 A | | 1/1976 | Vdoviak | |

(Continued)

FOREIGN PATENT DOCUMENTS

| CN | 102798149 B | 7/2014 |
|---|---|---|
| FR | 3097298 A1 | 12/2020 |

OTHER PUBLICATIONS

European search report issued in EP Patent Application No. 23168294.9 dated Sep. 5, 2023.

(Continued)

*Primary Examiner* — Andrew H Nguyen

(57) ABSTRACT

A combustion system comprising: a combustion chamber extending in an axial direction between an inlet and an outlet, the combustion chamber configured to receive an airflow through the inlet and to discharge the airflow through the outlet; a fuel injection port configured to inject fuel into the airflow to form an air-fuel mixture; an ignition system for igniting the air-fuel mixture in the combustion chamber, the ignition system comprising an array of electrical plasma initiation points disposed downstream of the fuel injection port, and distributed radially and circumferentially around the combustion chamber, wherein each electrical plasma initiation point comprises a pair of electrodes configured to apply a voltage across an electrode gap between the pair of electrodes to produce plasma within the air-fuel mixture passing between the electrodes, thereby igniting the air-fuel mixture.

8 Claims, 3 Drawing Sheets

(56) References Cited

U.S. PATENT DOCUMENTS

| | | | | |
|---|---|---|---|---|
| 5,442,907 | A | * | 8/1995 | Asquith .................. H05H 1/46 |
| | | | | 60/39.821 |
| 5,617,717 | A | | 4/1997 | Asquith et al. |
| 5,685,142 | A | | 11/1997 | Brewer et al. |
| 6,415,609 | B1 | * | 7/2002 | Vacek ...................... F02K 3/11 |
| | | | | 60/761 |
| 2006/0292504 | A1 | | 12/2006 | Baboeuf et al. |
| 2009/0169367 | A1 | | 7/2009 | Wadia et al. |
| 2015/0107260 | A1 | | 4/2015 | Colannino et al. |
| 2015/0121886 | A1 | | 5/2015 | McCormick et al. |
| 2019/0186747 | A1 | | 6/2019 | Lowery et al. |
| 2019/0345895 | A1 | | 11/2019 | Rathay et al. |
| 2020/0025216 | A1 | * | 1/2020 | Rathay .................. F04D 29/687 |

OTHER PUBLICATIONS

Great Britain search report dated Mar. 24, 2023, issued in GB Patent Application No. 2206881.1.
Great Britain search report dated Nov. 1, 2022, issued in GB Patent Application No. 2206881.1.

* cited by examiner

COMBUSTION SYSTEM

CROSS-REFERENCE TO RELATED PATENT APPLICATIONS

This specification is based upon and claims the benefit of UK Patent Application No. GB 2206881.1, filed on May 11, 2023, the entire contents of which are herein incorporated by reference.

BACKGROUND

Technical Field

The present disclosure relates to a combustion system and an afterburner for a gas turbine engine, duct burner, ramjet or scramjet having the combustion system.

Description of Related Art

Typically, afterburners comprise fuel injectors and flameholders to anchor a flame within the afterburner. However, flameholders necessarily reduce the speed of the flow, such that the flow speed is limited.

SUMMARY

According to a first aspect of the present disclosure there is provided a combustion system comprising:
  a combustion chamber extending in an axial direction between an inlet and an outlet, the combustion chamber configured to receive an airflow through the inlet and to discharge the airflow through the outlet;
  a fuel injection port configured to inject fuel into the airflow to form an air-fuel mixture;
  an ignition system for igniting the air-fuel mixture in the combustion chamber, the ignition system comprising an array of electrical plasma initiation points disposed downstream of the fuel injection port, and distributed radially and circumferentially around the combustion chamber,
  wherein each electrical plasma initiation point comprises a pair of electrodes configured to apply a voltage across an electrode gap between the pair of electrodes to produce plasma within the air-fuel mixture passing between the electrodes, thereby igniting the air-fuel mixture.

It may be that the combustion system comprises a vane structure in the combustion chamber, the vane structure configured to guide the airflow from the inlet. It may be that the array of electrical plasma initiation points are disposed on the vane structure and distributed radially and circumferentially around the vane structure. The vane structure can be used to protect the electrodes and the services to the electrodes, whilst minimally impeding the airflow through the combustion chamber.

It may be that the vane structure comprises a plurality of circumferentially distributed vanes. It may be that each electrical plasma initiation point comprises a pair of electrodes on a single vane separated along a radial direction, perpendicular to the axial direction, such that one electrode from each electrical plasma initiation point is disposed radially outwardly of the other electrode from respective electrical plasma initiation point.

It may be that the vane structure comprises a plurality of circumferentially distributed vanes, wherein each electrical plasma initiation point comprises a pair of electrodes on a single vane separated along the axial direction such that an upstream electrode from each electrical plasma initiation point is upstream of a downstream electrode from the respective electrical plasma initiation point.

It may be that the upstream electrode is configured to be a negatively charged electrode, and the downstream electrode is configured to be positively charged.

It may be that the vane structure comprises a circumferentially distributed plurality of vanes. It may be that each electrical plasma initiation point comprises a first electrode on a first vane and a second electrode on a circumferentially adjacent second vane.

It may be that the electrodes of each electrical plasma initiation point are embedded in, and lie flush with, the respective vanes on which they are disposed.

It may be that the vane structure comprises a plurality of integrated fuel injection ports, each fuel injection port being disposed upstream of the plurality of electrical plasma initiation points on the vane structure.

It may be that the electrical plasma initiation points are distributed in rings around the vane structure, with each ring disposed at a different radial extent.

It may be that the combustion system comprises a controller configured to control the electrodes to discontinuously energise. The discontinuous energisation may be with a pulse frequency of at least 1 kHz.

According to a second aspect of the present disclosure, there is provided an afterburner for a gas turbine engine, duct burner, ramjet, or scramjet comprising the combustion system according to the first aspect.

It may be that the vane structure spans across the core duct and the bypass duct, and wherein electrodes on the vane structure are disposed within the core duct and the bypass duct.

The afterburner may not comprise a flameholder

It may be that a controller controls the electrodes disposed within the bypass duct to be continuously energised. It may be that a controller controls the electrodes disposed within the core duct to be discontinuously energised. The discontinuous energisation may be with a pulse frequency of at least 1 kHz.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade.

Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc.

The fan of a gas turbine as described and/or claimed herein may have any desired number of fan blades, for example 16, 18, 20, or 22 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

DESCRIPTION OF THE DRAWINGS

Embodiments will now be described, by way of example only, with reference to the accompanying Figures, in which.

DETAILED DESCRIPTION

Figure 1:
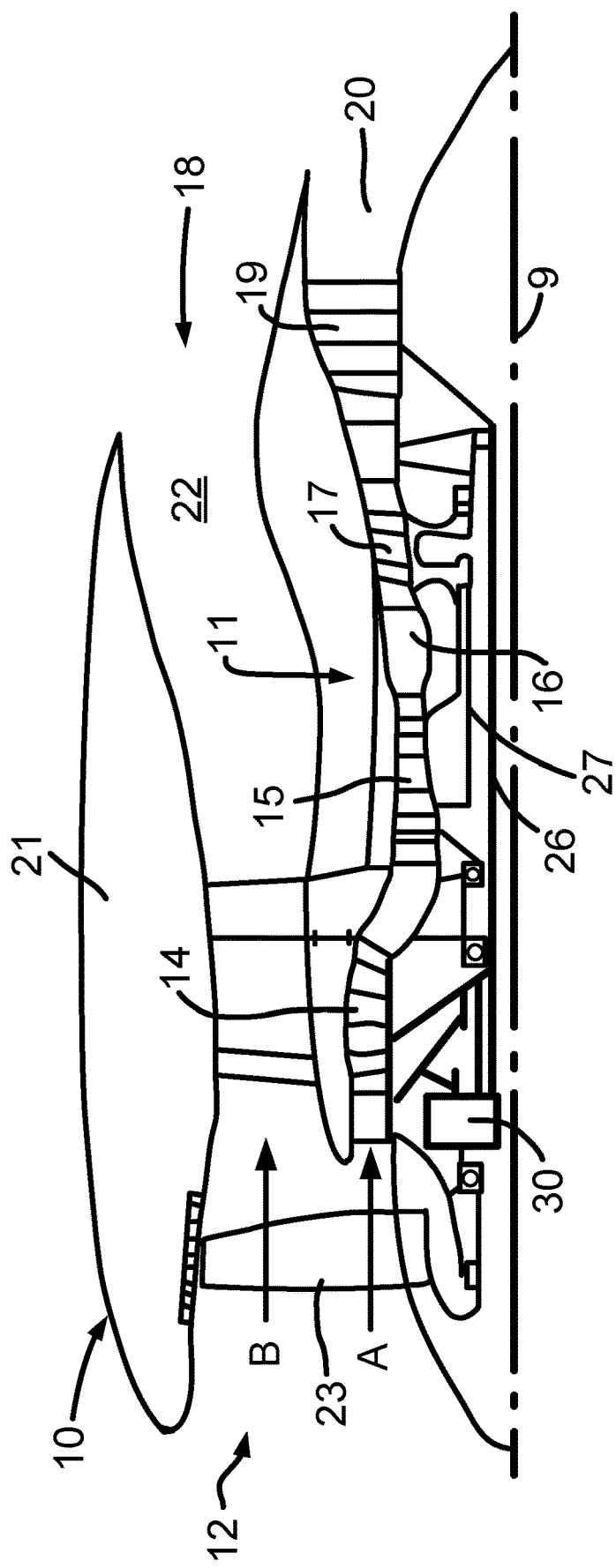
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high pressure and low-pressure turbines 17, 19 before being exhausted through the nozzle 20 to provide some propulsive thrust. The high-pressure turbine 17 drives the high pressure compressor 15 by a suitable interconnecting shaft 27. The fan 23 generally provides the majority of the propulsive thrust. The epicyclic gearbox 30 is a reduction gearbox.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example, or to a duct burner, ramjet, or scramjet. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 2:
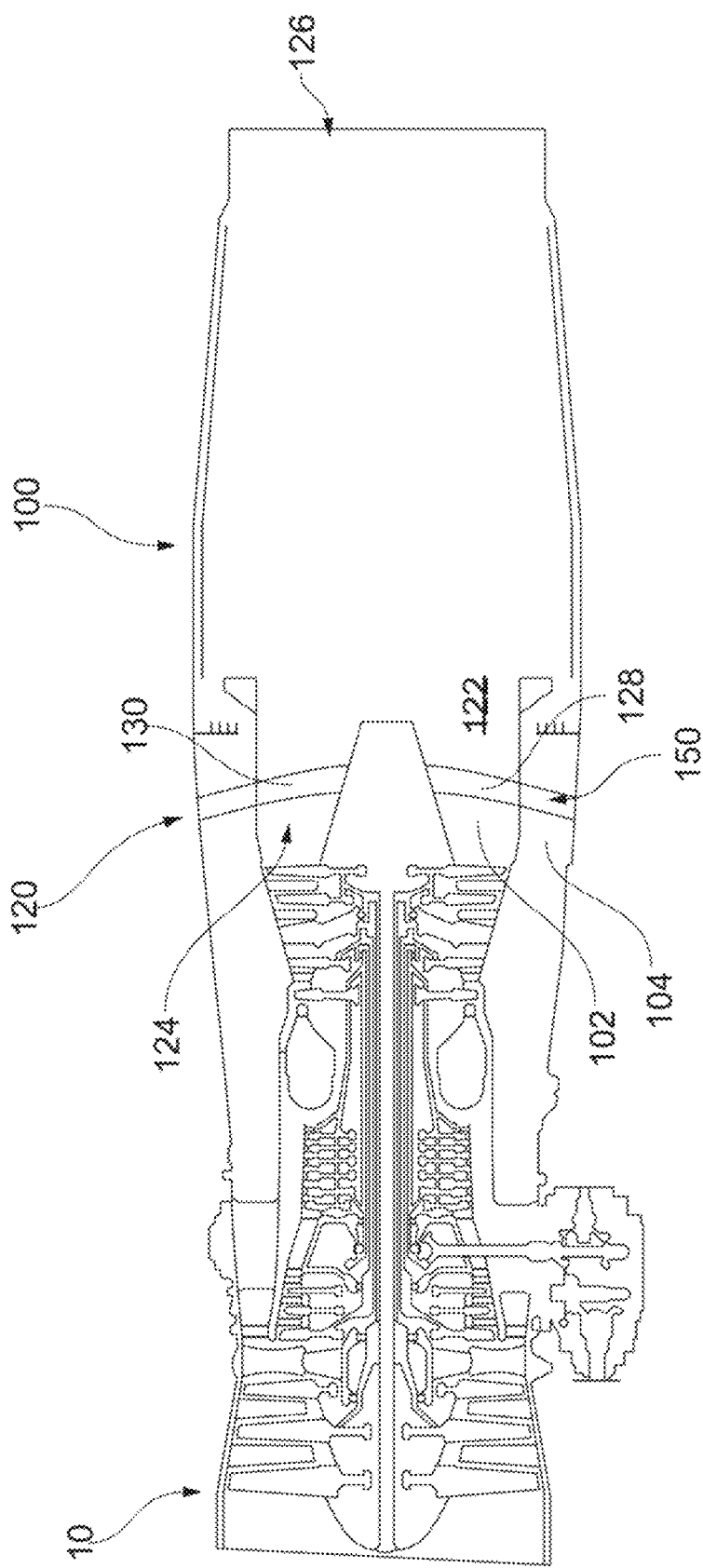
FIG. 2 schematically shows an axial cross-sectional view of the gas turbine engine with an afterburner having a combustion system.

FIG. 2 shows the gas turbine engine 10 with an afterburner 100 at the exhaust of the gas turbine engine 10. In this example, the afterburner 100 comprises a core duct 102 and a bypass duct 104 which receive airflow respectively from the core 11 and the bypass duct 22 of the gas turbine engine 10. In some examples, the afterburner may not separate a core duct and a bypass duct, such as in a turbojet which has only a single main gas path.

The afterburner 100 comprises a combustion system 120 which is configured to combust fuel to provide additional thrust in the afterburner 100. The combustion system 120 in this disclosure is sufficient to anchor a flame in the afterburner, such that no flameholders are required to slow the speed of the airflow. Therefore, it can be seen that, in this example, the afterburner 100 does not comprise any flameholders.

The combustion system 120 comprises a combustion chamber 122 extending in an axial direction between an inlet 124 and an outlet 126. The combustion chamber 122 is configured to receive an airflow through the inlet 124 (i.e., the core airflow A and bypass airflow B from the gas turbine engine 10). The combustion chamber 122 is configured to discharge the airflow through the outlet 126.

The combustion system comprises a fuel injection port 128 configured to inject fuel into the airflow in the combustion chamber 122 to form an air-fuel mixture, and an ignition system 130 (best seen in FIGS. 3 and 4) for igniting the air-fuel mixture in the combustion chamber 122. The ignition system 130 is disposed downstream of the fuel injection port 128.

In this example, the fuel injection port 128 and the ignition system 130 are integrated into a single component in the form of a vane structure 150, which in this example is an exit guide vane. This minimises the disruption to the airflow in the afterburner. In other examples, the fuel injection port and the ignition system may be on separately mounted components.

In this example, the vane structure 150 is mounted at the inlet of the combustion chamber 122 such that it is configured to guide the airflow from the inlet 124. In other examples, the vane structure may be mounted in any suitable location to guide the airflow from the inlet 124.

In this example, the vane structure 150 spans across the core duct 102 and the bypass duct 104 of the afterburner 100. In other examples, the vane structure may span only the core duct or only the bypass duct, and/or only part of either duct.

Figure 3:
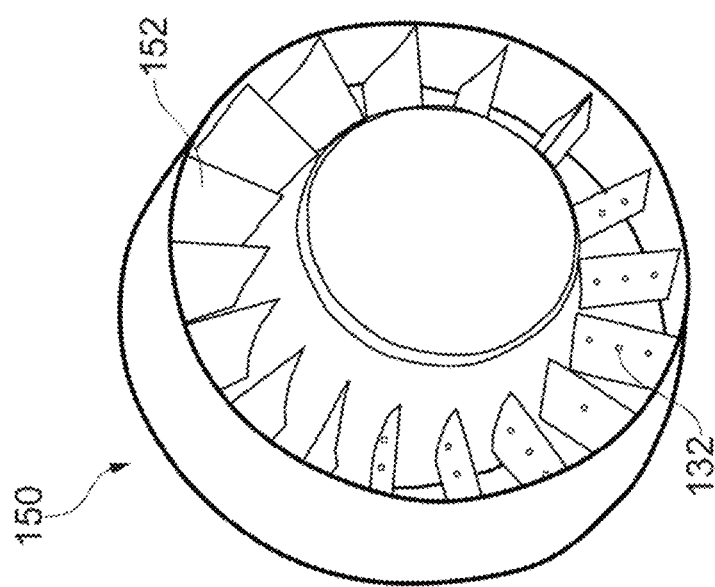
FIG. 3 schematically shows an oblique view of a vane structure of the combustion system.

FIG. 3 shows the vane structure 150 independently of the combustion system 120. The vane structure 150 in this example comprises a plurality of circumferentially distributed vanes 152, which have an aerodynamic profile to minimise disruption to the airflow.

The ignition system 130 on the vane structure 150 comprises an array of electrical plasma initiation points 132. In this example, the electrical plasma initiation points 132 are disposed on the vane structure 150 and distributed radially and circumferentially around the vane structure 150. The electrical plasma initiation points 132 use alternating current (AC) or direct current (DC) to energise a space, and thereby to create plasma within the space from the air-fuel mixture. This merely requires a simple pair of electrodes and is therefore very space efficient. Further, this enables many electrical plasma initiation points 132 to be distributed around the combustion chamber, both radially and circumferentially, to enable plasma to be generated at many different points from the air-fuel mixture in the airflow which is guided by the vane structure 150. Integration of the electrical plasma initiation points 132 on the vane structure further improves the design of the engine, since any number of electrical plasma initiation points 132 can be disposed on the vane structure 150 and powered through electrical components sheltered within the vane structure 150, without impeding the air flow through the vane structure 150.

In an example in which there is no vane structure, or the ignition system is not integrated with a vane structure, the ignition system may simply comprise an array of electrical plasma initiation points which are distributed radially and circumferentially around the combustion chamber 122.

Each of the electrical plasma initiation points 132 can generated plasma which enables anchoring of a flame. The radial and circumferential distribution of a plurality of electrical plasma initiation points 132 enables simple combustion staging, to optimise sub-system performance, by fuelling and energising sub-groups of fuel injector ports 128 and electrical plasma initiation points 132. This allows efficient combustion at low reheat settings, and also permits a low thrust step when reheat is initiated.

Figure 4:
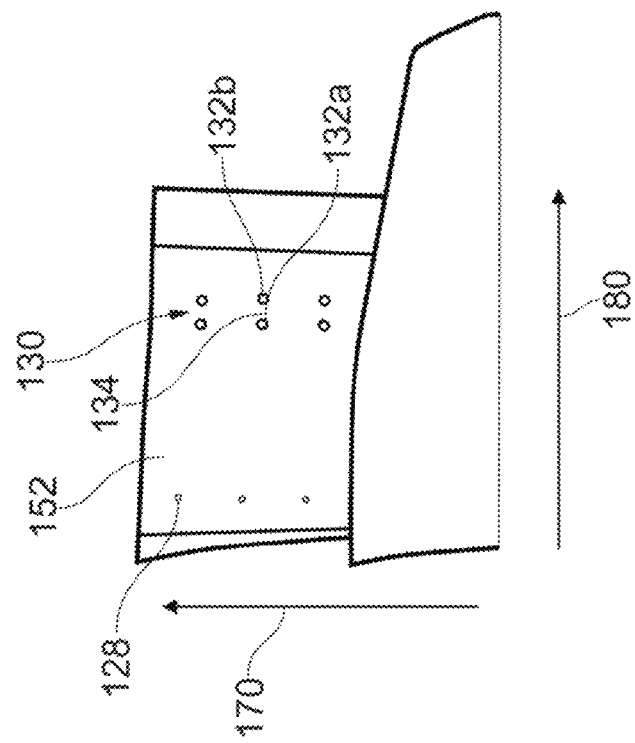
FIG. 4 schematically shows a close-up cross-sectional view of a part of the vane structure.

As shown in FIG. 4, each of the electrical plasma initiation points 132 comprises a pair of electrodes 132a, 132b which are configured to apply a voltage across an electrode gap 134 to produce plasma within the air-fuel mixture passing between the electrodes 132a, 132b, thereby igniting the air-fuel mixture. The electrode gap may be between 1-20 mm wide.

In this example, the electrodes 132a, 132b are disposed on the vane structure 150 within both the core duct 102 and the bypass duct 104 of the afterburner 100. In other examples, they may only be disposed in the core duct 102 or only in the bypass duct 104.

When the ignition system 130 is integrated in the vane structure 150 as shown, the vane structure 150 can then be used to protect the electrodes 132a, 132b and the services to the electrodes 132a, 132b, whilst minimally impeding the airflow through the combustion chamber 122.

In this example, each electrical plasma initiation point 132 comprises a pair of electrodes 132a, 132b on a single vane 152 separated along the axial direction 180 (which, in this example, is parallel to the principal rotation axis 9 of the gas turbine engine 10) such that an upstream electrode 132a from each electrical plasma initiation point 132 is upstream of a downstream electrode 132b from the respective electrical plasma initiation point 132. The upstream electrode 132a may be configured to be a negatively charged electrode, while the downstream electrode 132b may be configured to be a positively charged electrode, which improves function, as positive ions would move in counter-flow, thereby increasing time of exposure.

In this example, each of the electrical plasma initiation points 132 are distributed in rings around the vane structure 150, with each ring disposed at a different radial extent. In other examples, the radial extent of the electrical plasma initiation points may form any suitable pattern on the vane structure.

In some examples, each electrical plasma initiation point 132 may comprise a pair of electrodes on a single vane 152, and separated along a radial direction 170, perpendicular to the axial direction 180. Therefore, one electrode from each electrical plasma initiation point may be disposed radially outwardly of the other electrode from the respective electrical plasma initiation point.

In other examples, each electrical plasma initiation point 132 may comprise a first electrode on a first vane 152 and a second electrode on a circumferentially adjacent second vane 152, such that the electrode gap spans a space between each vane 152.

In this example, each of the electrodes 132a, 132b of each electrical plasma initiation point 132 is embedded in, and lies flush with, the respective vane 152 on which they are disposed. In other examples, the electrodes may extend out from the surface of the vane. For example, when the pair of electrodes of an electrical plasma initiation point are on adjacent vanes, the electrodes may extend out of the respective vane surface towards one another to reduce the electrode gap between them.

In this example, the vane structure 150 also comprises a plurality of integrated fuel injection ports 128, where each fuel injection port 128 is disposed upstream of the plurality of electrical plasma initiation points 132 on the vane structure 150. In some examples, only the fuel injection ports may be on the vane structure or only the electrical plasma initiation ports may be on the vane structure, or the fuel injection ports and the electrical plasma initiation ports may be separately mounted from the vane structure.

In this example, the combustion system 120 comprises a controller which is configured to control the electrodes 132a, 132b within the core duct 102 of the afterburner 100 to discontinuously energise to reduce the electrical power required for flame anchoring, as continuous ignition is not required, which reduces electrode erosion. In other examples, the controller may control the electrodes within the bypass duct 104 of the afterburner 100 to continuously energise. The pulse frequency may be any suitable frequency which may be dependent on the velocity of airflow and the scale of the combustion system 120.

In examples where a core duct and bypass duct are not separated in an afterburner, the combustion system may comprise a controller which is configured to control all of the electrodes to discontinuously energise, or all of the electrodes to continuously energise or otherwise control the electrodes based on the gas stream conditions. Discontinuous energisation may be with a pulse frequency of at least 1 kHz, or any suitable pulse frequency dependent on the velocity of airflow and the scale of the combustion system 120.

Although the disclosure relates generally to a gas turbine engine, it will be appreciated that the combustion system and afterburner can be equally applied to any suitable engine, such as a duct burner, a ramjet, or a scramjet. Further, although the disclosure relates generally to the fuel injection ports and the electrical plasma initiation points being integrated with a vane structure, this is not essential.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A combustion system comprising:
   a combustion chamber extending in an axial direction between an inlet and an outlet, the combustion chamber configured to receive an airflow through the inlet and to discharge the airflow through the outlet;
   a fuel injection port configured to inject fuel into the airflow to form an air-fuel mixture;
   an ignition system for igniting the air-fuel mixture in the combustion chamber, the ignition system comprising an array of electrical plasma initiation points disposed downstream of the fuel injection port, and distributed radially and circumferentially around the combustion chamber;
   a vane structure in the combustion chamber, the vane structure configured to guide the airflow from the inlet, wherein the array of electrical plasma initiation points are disposed on the vane structure and distributed radially and circumferentially around the vane structure,
   wherein each electrical plasma initiation point comprises a pair of electrodes configured to apply a voltage across an electrode gap between the pair of electrodes to produce plasma within the air-fuel mixture passing between the electrodes, thereby igniting the air-fuel mixture; and
   wherein the vane structure comprises a circumferentially distributed plurality of vanes, wherein each electrical plasma initiation point comprises a first electrode on a first vane and a second electrode on a circumferentially adjacent second vane.

2. The combustion system according to claim 1, wherein the electrodes of each electrical plasma initiation point are embedded in, and lie flush with, the respective vanes on which they are disposed.

3. The combustion system according to claim 1, wherein the vane structure comprises a plurality of integrated fuel injection ports, each fuel injection port being disposed upstream of the plurality of electrical plasma initiation points on the vane structure.

4. The combustion system according to claim 1, wherein the electrical plasma initiation points are distributed in rings around the vane structure, with each ring disposed at a different radial extent.

5. The combustion system according to claim 1, comprising a controller configured to control the electrodes to discontinuously energise.

6. An afterburner for a gas turbine engine, duct burner, ramjet, or scramjet comprising a core duct, a bypass duct, and the combustion system according to claim 1.

7. The afterburner according to claim 6, wherein a controller controls the electrodes disposed within the bypass duct to be continuously energised.

8. The afterburner according to claim 6, wherein a controller controls the electrodes disposed within the core duct to be discontinuously energised.

* * * * *